Jan. 21, 1969 D. J. SNYDER 3,423,536
AUTOMATIC STEREO SWITCHING AND INDICATING CIRCUIT
Filed Dec. 28, 1965
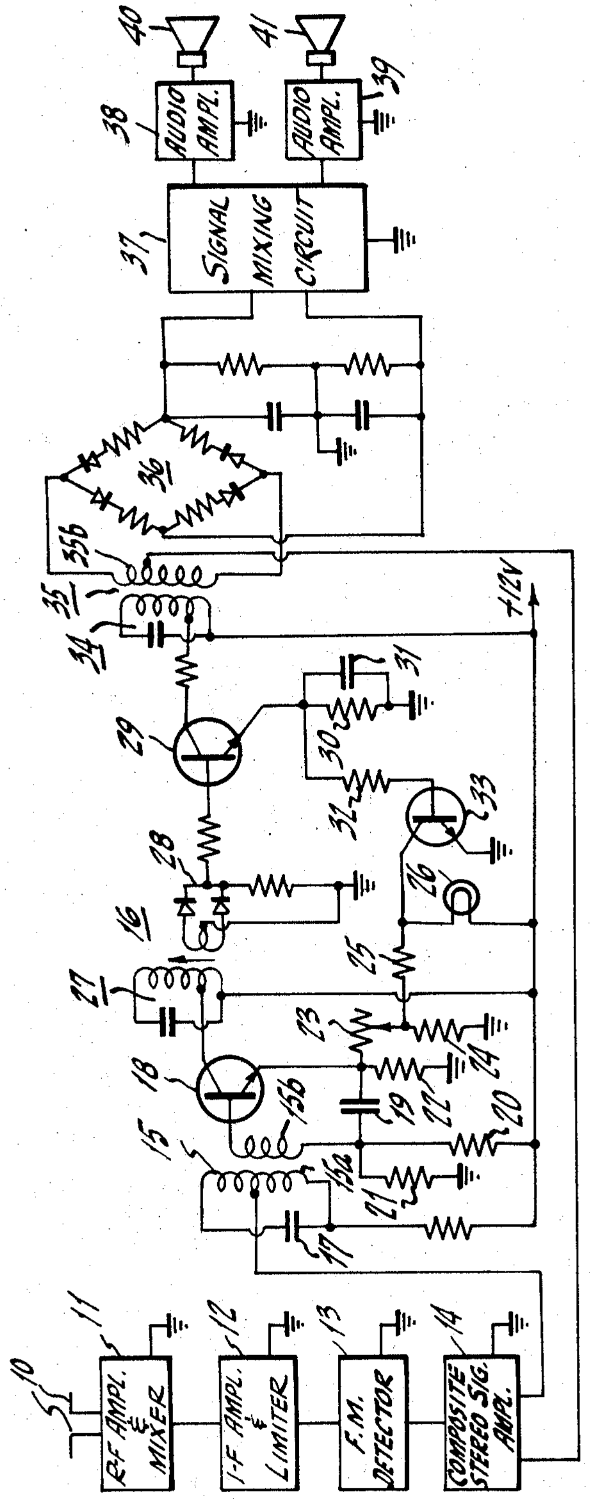
INVENTOR.
DONALD J. SNYDER
BY Eugene M. Whitacre
Attorney United States Patent Office 3,423,536

Patented Jan. 21, 1969

3,423,536

AUTOMATIC STEREO SWITCHING AND INDICATING CIRCUIT

Donald J. Snyder, Indianapolis, Ind., assignor to Radio Corporation of America, a corporation of Delaware Filed Dec. 28, 1965, Ser. No. 516,889
U.S. Cl. 179—15 7 Claims
Int. Cl. H04j *1/02*

The present invention relates to stereophonic multiplex radio signal receivers, and more particular to compatible stereophonic multiplex frequency modulation radio receivers which operate in response to both monophonic and stereophonic signal information.

Under the presently accepted method of FM stereophonic broadcasting, a main carrier wave is frequency modulated by the sum of two audio frequency signals such as two stereophonically related left (L) and right (R) signals, the carrier wave being adapted for compatible reception by either monophonic or stereophonic receivers. The main carrier wave further is provided with stereophonic information in the form of a suppressed sub-carrier wave amplitude modulated with the difference of the two stereophonically related signals $(L-R)$ and a pilot signal for use in demodulating the suppressed sub-carrier wave.

In the stereophonic receiver, a composite signal is produced at the output of the frequency modulation detector, the composite signal comprising the sum $(L+R)$ signal component useable either by monophonic or stereophonic frequency modulation receivers, a 19 kc. (kilocycles per second) pilot signal and side bands of a suppressed 38 kc. sub-carrier representative of the difference $(L-R)$ signal component. In order to reproduce the audio stereophonic program information, a 38 kc. signal is generated in the receiver in timed relation with the 19 kc. pilot signal. When a frequency modulation station broadcasts monophonic program material and therefore does not transmit a 19 kc. pilot signal, it is desirable to automatically disable the 38 kc. generating circuits. On the other hand, when the broadcast program material does include stereophonic information, it is desirable to activate the stereophonic circuits automatically but only when the 19 kc. pilot signal exceeds a predetermined threshold level, thereby preventing such circuits from responding to noise or other spurious signals. It is also desirable that the stereophonic circuits remain activated until the 19 kc. pilot signal drops substantially below the above mentioned threshold level, i.e. the activation characteristic of the stereophonic circuits preferably includes a "hysteresis" effect.

It is accordingly an object of this invention to provide an improved stereophonic multiplex unit for FM receivers.

It is a further object of this invention to provide automatic stereo switching means for an FM receiver wherein the stereophonic circuits are activated only upon reception of a pilot signal which exceeds a predetermined threshold level.

It is a further object of this invention to provide an improved automatic stereophonic-monophonic switching and indicating circuit which provides a hysteresis effect so that the received signal threshold level required to activate the circuit for stereophonic reception is greater than the signal level required to maintain the circuit in the stereophonic reception mode.

In a receiver embodying the present invention, the composite stereophonic signal produced at the output of the frequency modulation detector is fed to an amplifier including a highly frequency selective circuit arranged to attenuate frequencies other than 19 kc., thereby separating the pilot signal from the remainder of the composite signal for application to an automatic stereo switching and indicating circuit. The switching and indicating circuit comprises transistor amplifier means, normally biased to cut off, for producing from the 19 kc. pilot signal a 38 kc. stereo demodulating signal. Regenerative feedback switching means are coupled to the transistor amplifier means for turning such amplifier means on when sufficient 19 kc. pilot signal is extracted from the composite signal to insure proper stereophonic reproduction. The regenerative feedback means is arranged to modify the operating characteristics of the amplifier such that a relatively higher level pilot signal is required to initiate stereo operation than is required to maintain such operation, thereby providing a "hysteresis" operating characteristic.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing which illustrates, partially in block diagram form, a schematic circuit diagram of a stereophonic multiplex FM receiver including a sub-carrier wave regenerating circuit and automatic stereo switching means constructed in accordance with the present invention.

Referring to the drawing, the frequency modulation receiver adapted for stereophonic multiplex operation comprises an antenna 10 coupled to a radio frequency (RF) amplifier and mixer 11, the latter being tunable to receive signals in the frequency modulation broadcast band of 88 to 108 mc. An intermediate frequency (I.F.) amplifier and limiter 12 is coupled to the output of amplifier-mixer 11 and is followed by an FM detector 13. The output of the FM detector 13, at which a composite stereo signal is developed including the sum $(L+R)$ signal, the sub-carrier side bands representative of the difference $(L-R)$ signal and the 19 kc. pilot signal, is coupled to a composite stereo signal amplifier 14. Composite amplifier 14 amplifies and separates the 19 kc. pilot signal from the sum and difference stereophonic signal components, the latter components being coupled to a stereo detector circuit as will be explained more fully below. The 19 kc. pilot signal is coupled by means of a high Q transformer 15 tuned to 19 kc. to the input of a signal translating circuit 16 including an automatic stereo switching and indicating circuit constructed in accordance with the present invention.

A tuning capacitor 17 is coupled across the primary winding **15*a* of transformer 15** to assist in providing the desired frequency response.

The circuit 16 comprises a 19 kc. transistor amplifier 18 wherein the pilot signal is applied between the base and emitter electrodes by means of the combination of a capacitor 19 and the secondary winding **15*b* of transformer 15. One end of secondary winding 15*b* is coupled to the base electrode of transistor 18 while the other end is coupled to the junction point of a bias voltage divider comprising resistors 20 and 21**, the voltage divider being coupled across a positive voltage supply (e.g. +12 volts).

The emitter electrode of transistor 18 is coupled to a variable threshold biasing voltage source which includes the combination of a first resistor 22 coupled to ground, a threshold control variable resistor 23, a second resistor 24 coupled between the wiper arm of variable resistor 23 and ground, a third resistor 25 and a stereo indicator light 26, the light being coupled to the positive voltage supply (+12 volts). The combination of the above described threshold biasing source and the fixed voltage supplied at the junction of resistors 20 and 21 is arranged such that, in the absence of a 19 kc. pilot signal input, transistor 18 is cut off.

The collector or output electrode of transistor 18 is coupled to a tuned output circuit 27 across which an amplified 19 kc. pilot signal is developed during reception of stereo program material. The pilot signal developed across tuned circuit 27 is applied to a full-wave rectifier 28 which serves as a frequency doubling circuit for applying to a 38 kc. transistor amplifier 29 a 38 kc. full wave rectified voltage. In the absence of this 38 kc. voltage, amplifier 29 is biased to cut off, the emitter electrode thereof being coupled to the parallel combination of a relatively large resistor 30 and a capacitor 31. A relatively small resistor 32 (e.g. $\frac{1}{10}$ the resistance of resistor 30) is coupled between the emitter electrode of transistor amplifier 29 and the base electrode of a stereo switching transistor 33. The collector electrode of switching transistor 33 is coupled to the junction of stereo indicator light 26 and resistor 25 while the emitter electrode of transistor 33 is coupled to ground. Transistor 33 is non-conductive (cut off) when transistor amplifier 29 is cut off.

During the reception of stereo program material, an amplified 38 kc. signal is developed across tuned circuit 34 which is coupled to the collector electrode of amplifier 29. The 38 kc. signal is applied by means of a transformer 35 to a synchronous detector which when supplied with the $(L+R)$ signal and the side bands of the suppressed 38 kc. sub-carrier through the center tap of the secondary winding **35*b* produces the stereophonic left and right audio signals. A signal mixing circuit 37, left and right audio amplifiers 38 and 39, and left and right speakers 40 and 41 are coupled to detector circuit 36 in the manner shown in the figure to reproduce the separate left and right stereophonically related audio signals. The signal mixing circuit 37** may comprise an emitter coupled differential amplifier to cross couple the two stereo channels and reduce cross talk which may result from the demodulation of the composite signal.

The detailed operation of the signal translating circuit 16 including an automatic stereo switching and indicating circuit constructed in accordance with the present invention now will be described.

During the reception of monophonic signals or of stereophonic signals wherein the 19 kc. pilot signal is of insufficient level and duration to provide acceptable stereophonic operation, the reverse bias applied to transistor 18 maintains that transistor cut off. Specifically, substantially the full positive voltage supply (+12 volts) is provided at the collector electrode of switching transistor 33. This voltage is divided by means of the combination of resistors 24 and 25 and again by the combination of variable resistor 23 and resistor 22 so as to bias transistor 18 to a cut off condition. Transistors 29 and 33 are also cut off under these conditions.

During stereophonic reception, 19 kc. pilot signals are applied via transformer 15 to the base electrode of transistor 18. Initially the pilot signals are coupled via the base-collector capacitance of transistor 18 to tuned circuit 27. These relatively low level 19 kc. signals are then doubled to 38 kc. by means of full-wave rectifier 28, a relatively small direct voltage pulsating at a 38 kc. rate thereby being supplied to the base electrode of transistor amplifier 29. This voltage starts to turn on transistor amplifier 29. Since, at this time, switching transistor 33 is biased to cut off and therefore presents a high base-emitter resistance in series with resistor 32, the resistance 30 provides the effective emitter to ground resistance for transistor amplifier 29. Resistor 30 is selected relatively high in value as compared with the normal operating emitter resistance for transistor amplifier 29. Therefore the relatively small current which begins to flow in transistor amplifier 29 develops a relatively large voltage across resistor 30. This last-named voltage is applied between the base and emitter of switching transistor 33 and tends to turn transistor 33 on. As transistor 33 turns on, its collector voltage decreases from substantially +12 volts towards ground. The voltage applied to the emitter of transistor 18 by the threshold bias supply is reduced tending to turn on transistor 18. When the 19 kc. pilot signal is applied to transformer 15 with sufficient amplitude for a sufficient duration the regenerative action outlined above continues until transistors 18, 29, and 33 are turned on, transistor 33 being arranged to be driven into saturation conduction. Under these conditions, +12 volts will be applied across the stereo indicator light 26 which will be lighted to indicate the reception of stereo program material. Furthermore, a steady 38 kc. signal will be applied via transformer 35 to the detection circuit 36 so as to permit reproduction of the stereophonically related left and right audio signals in speakers 40 and 41.

When switching transistor 33 is turned full on, its base to emitter resistance is small and the relatively low resistance resistor 32 is coupled substantially directly across the relatively high resistance resistor 30 in the emitter circuit of transistor amplifier 29. Under such conditions, a relatively large change in current in transistor amplifier 29 will be required to produce a significant change in the voltage applied between the base and emitter electrodes of switching transistor 33. The automatic stereo switching and indicating circuit therefore will continue to operate, once activated, until the 19 kc. pilot signal level drops substantially below the level required initially to activate the circuit.

The above-described hysteresis operating characteristic is accomplished principally as a result of the change in the emitter to ground resistance of transistor amplifier 29 as switching transistor 33 is turned on.

What is claimed is:

1. A circuit for frequency modulation stereophonic receivers comprising:

an input circuit for coupling to a source of composite stereophonic signals including a pilot signal, pilot signal amplifier means coupled to said input circuit including a biasing circuit for maintaining said amplifier means in substantially non-conductive condition in the absence of said pilot signal, signal developing means coupled to said amplifier means for developing a signal at a frequency related to that of said pilot signal, said signal developing means including a relatively high impedance self-biasing circuit, regenerative feedback switching means coupled across said self-biasing circuit including the series combination of a relatively low impedance and a transistor switch maintained in non-conductive condition in the absence of said pilot signal, said switching means further being coupled to said pilot signal amplifier biasing circuit to modify the effect of said biasing circuit on said transistor amplifier so as to regeneratively drive said pilot signal amplifier into conductive condition upon the application of said pilot signal to said pilot signal amplifier.

2. A circuit for frequency modulation stereophonic receivers according to claim 1 wherein:

said transistor switch comprises an input circuit including said relatively low impedance and an output circuit including a voltage supply coupled to said pilot signal amplifier biasing circuit, said switching means being arranged to regeneratively decrease the voltage applied to said amplifier biasing circuit as said transistor switch is driven into conduction.

3. A circuit for frequency modulation stereophonic receivers according to claim 2 wherein:

said output circuit of said transistor switch further includes an indicator light arranged to indicate the presence of said pilot signal at said pilot signal amplifier input circuit.

4. A circuit for frequency modulation stereophonic receivers according to claim 3 wherein said pilot signal amplifier input circuit includes frequency selective means for rendering said pilot signal amplifier responsive to said pilot signal frequency.

5. A circuit for frequency modulation stereophonic receivers according to claim 4 wherein said pilot signal amplifier comprises a transistor including base-to-collector capacitance whereby said pilot signal is coupled at reduced level to said signal developing means when said pilot signal amplifier is biased in substantially non-conductive condition.

6. A circuit for frequency modulation stereophonic receivers according to claim 5 wherein said signal developing means comprises a transistor having base, emitter and collector electrodes, an output circuit coupled to said collector electrode and the parallel combination of a relatively high resistance and a capacitor coupled to said emitter electrode, the relatively low impedance input circuit of said transistor switch being coupled to said emitter electrode.

7. A circuit for frequency modulation stereophonic receivers comprising:

means providing a source of composite stereophonic signals including a pilot signal;

pilot signal amplifier means including a transistor having base, emitter and collector electrodes;

means coupling the base and emitter electrodes of said pilot signal amplifier to receive at least the pilot signal component from said source of composite signals;

a biasing circuit including a resistor connected between the base and emitter electrodes of said pilot signal amplifier;

a pilot signal output circuit coupled between the collector and emitter electrodes of said pilot signal amplifier circuit;

an output amplifier stage including a transistor having base, emitter and collector electrodes;

means coupling the output circuit of said pilot signal amplifier to the base electrode of said output amplifier stage transistor;

a demodulation signal output circuit for developing a signal related in phase and frequency to said pilot signal for use in demodulating said composite stereophonic signal, said demodulation signal output circuit coupled between the collector and emitter electrodes of said output stage transistor;

a self-biasing resistor connected in series with the emitter electrode of said output stage transistor to provide degenerative feedback;

a switching transistor having base, emitter and collector electrodes;

means connecting the base-emitter path of said switching transistor in parallel with said self-biasing resistor;

means connecting the collector to emitter path of said switching transistor across said resistor connected between the base and emitter electrodes of said pilot signal amplifier;

pilot signal responsive biasing means for maintaining said pilot signal amplifier, said output amplifier stage and said switching transistor substantially cut-off in the absence of composite stereophonic signals including a pilot signal, and operative during the presence of a composite stereophonic signal including a pilot signal to cause said switching transistor to conduct and (1) substantially bypass said self-biasing resistor to reduce the degeneration in said output amplifier stage, and (2) change the base to emitter bias of said pilot signal amplifier to increase the gain of the pilot signal amplifier.

References Cited

UNITED STATES PATENTS

| | | | |
|---|---|---|---|
| 3,151,217 | 9/1964 | Dias | 179—15 |
| 3,242,264 | 3/1966 | De Vries | 179—15 |
| 3,264,414 | 8/1966 | Santilli | 179—15 |
| 3,286,035 | 11/1966 | Dias | 179—15 |
| 3,288,936 | 11/1966 | Jabbar | 179—15 |
| 3,294,912 | 12/1966 | Merritt | 179—15 |
| 3,294,916 | 12/1966 | Elias | 179—15 |
| 3,297,826 | 1/1967 | Dias | 179—15 |

RALPH D. BLAKESLEE, *Primary Examiner.*